US008448551B2

(12) United States Patent
Dole

(10) Patent No.: US 8,448,551 B2
(45) Date of Patent: May 28, 2013

(54) DUAL LOCK BRAKE LATHE CHUCK

(76) Inventor: Long Dole, Westminster, CA (US)

( * ) Notice: Subject to any disclaimer, the term of this patent is extended or adjusted under 35 U.S.C. 154(b) by 342 days.

(21) Appl. No.: 13/045,515

(22) Filed: Mar. 10, 2011

(65) Prior Publication Data
US 2011/0219896 A1  Sep. 15, 2011

Related U.S. Application Data

(60) Provisional application No. 61/312,338, filed on Mar. 10, 2010.

(51) Int. Cl.
B23B 31/02 (2006.01)
B23B 31/16 (2006.01)

(52) U.S. Cl.
USPC ............................................. 82/165; 82/142

(58) Field of Classification Search
USPC .................. 82/165, 167, 142, 147; 279/114, 279/110, 123
See application file for complete search history.

(56) References Cited

U.S. PATENT DOCUMENTS 2,528,442 A * 10/1950 Leifer ......................... 279/4.12
3,028,169 A * 4/1962 Skillin .......................... 279/114
5,167,175 A * 12/1992 Rohm ............................ 82/142
6,079,303 A * 6/2000 Lyachovitsky ................. 82/165

FOREIGN PATENT DOCUMENTS

DE  10060930 A * 7/2000

* cited by examiner

Primary Examiner — Will Fridie, Jr.
(74) Attorney, Agent, or Firm — Sinorica, LLC

(57) ABSTRACT

A dual lock brake lathe chuck comprises of at least one primary drive gear with keyhole along with at least one secondary drive gear with keyhole. The keyhole is rotated through the side of the chuck whereas the secondary keyhole is rotated through the back of the chuck. Rotation of either the primary keyhole or the secondary keyhole extends a plurality of jaws to secure a brake rotor on a brake lathe. The secondary keyhole positioned on the back of the chuck allows easier access of the keyhole when a brake rotor is attached to the chuck allowing the user to ensure that the brake rotor is securely tightened onto the brake lathe chuck.

20 Claims, 5 Drawing Sheets

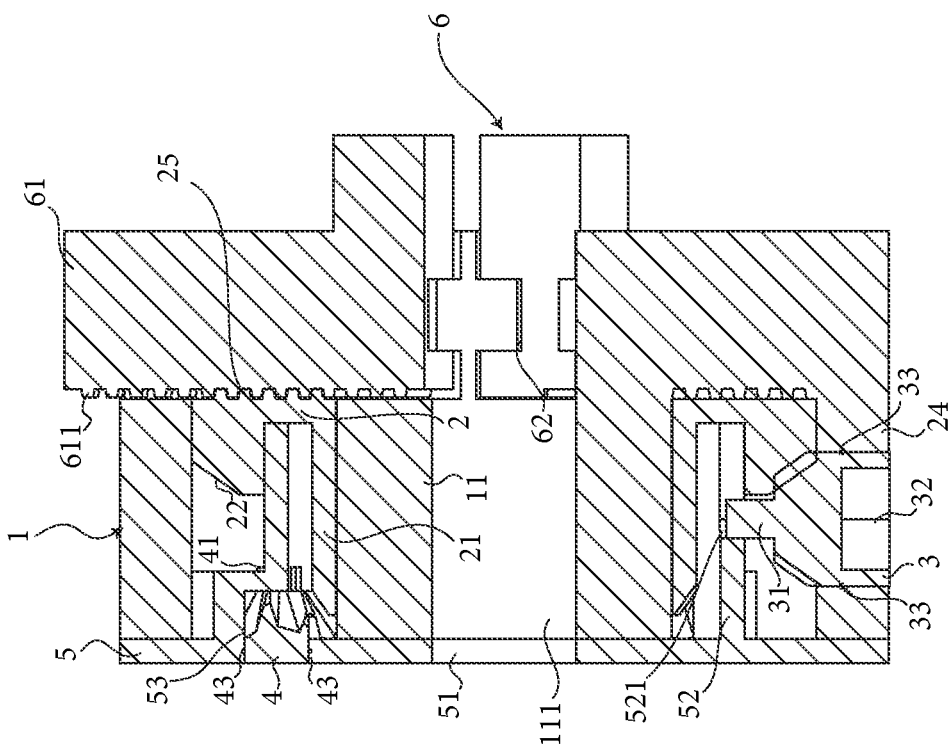
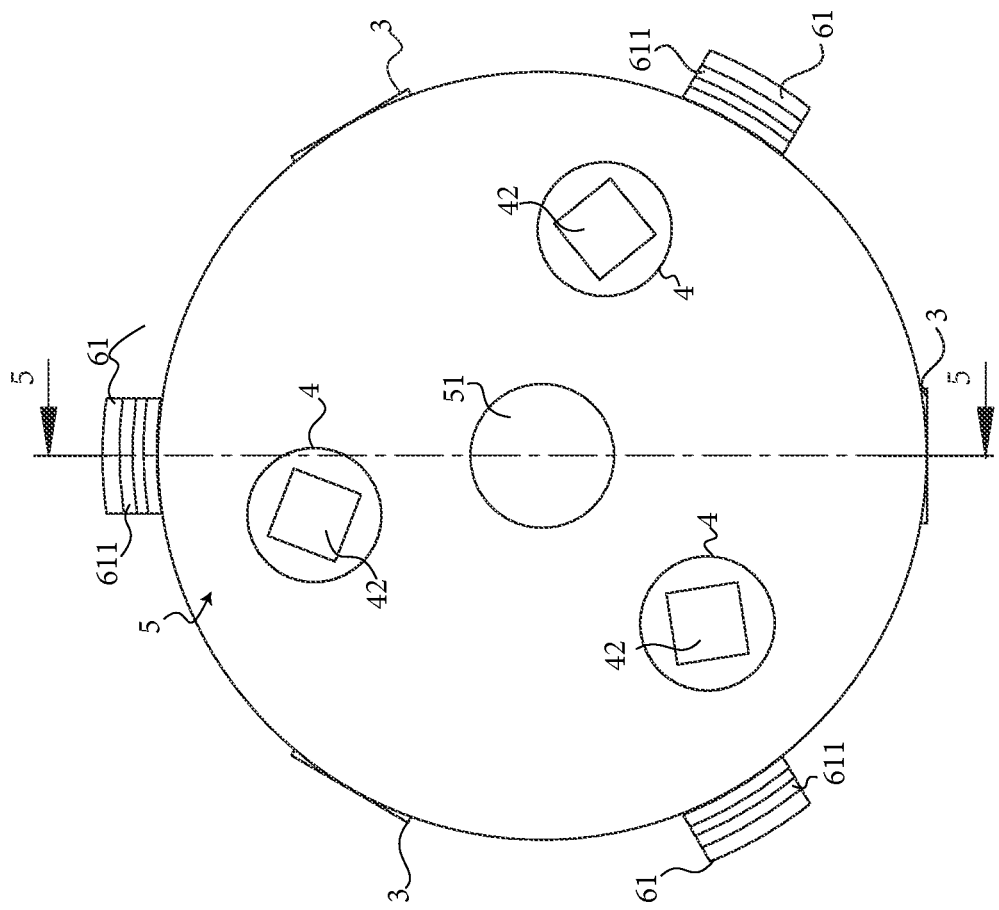
FIG. 5
FIG. 4

DUAL LOCK BRAKE LATHE CHUCK

The current application claims a priority to the U.S. Provisional Patent application Ser. No. 61/312,338 filed on Mar. 10, 2010.

FIELD OF THE INVENTION

The invention relates generally to a device used to hold brake rotors for resurfacing. The objective of the present invention is to allow users to ease the securing process of the rotor to the chuck.

BACKGROUND OF THE INVENTION

Brake lathe chucks have a plurality of jaws 61 which can be tightened to secure a brake rotor in place when spinning. To tighten these jaws, a series of gears within the chuck are turned. On a typical chuck, the gears are turned by means of a key lock. These key locks are inserted into a hole on the chuck which will allow the key to access the gears within the chuck for turning. Currently, the brake lathe chucks being sold on the market only offer chucks with key holes located on the circumference of the chuck. However the location of these key holes poses a problem and inconvenience for users. When a brake rotor is in place on the chuck often times, the brake rotor will obstruct the key lock from accessing the key hole from tightening the chuck. The present invention overcomes this problem by introducing a brake lathe chuck which includes key holes on the rear of the chuck where the brake lathe does not obstruct the key lock from accessing the holes.

Current brake lathe chucks on the market only offer chucks which include key locks on the circumference of the chuck. The placement of the keyholes on the circumference not only hinders the key lock from accessing it, it also makes it hard for the user to effectively tighten a brake rotor onto the chuck. Unable to effectively tighten a brake rotor onto a chuck, current brake lathe chuck pose a dangerous risk when operating the lathe.

It is therefore an objective of the present invention to introduce a chuck which not only includes standard key holes on the circumference of the chuck, but also a set of keyholes that are located at the rear of the chuck. The rear keyholes are easier to access when a brake rotor is attached to the chuck and allows the user to ensure that the brake rotor is securely tightened onto the brake lathe chuck. This placement of keyholes on the rear of the chuck ensures that the keyholes are not obstructed when a brake rotor is in place.

BRIEF DESCRIPTION OF THE DRAWINGS

FIG. 4 is a top view of the present invention.

FIG. 5 is a side view of the present invention showing the plan upon which a sectional view is taken and shown in FIG. 4.

DETAIL DESCRIPTIONS OF THE INVENTION

Figure 1:
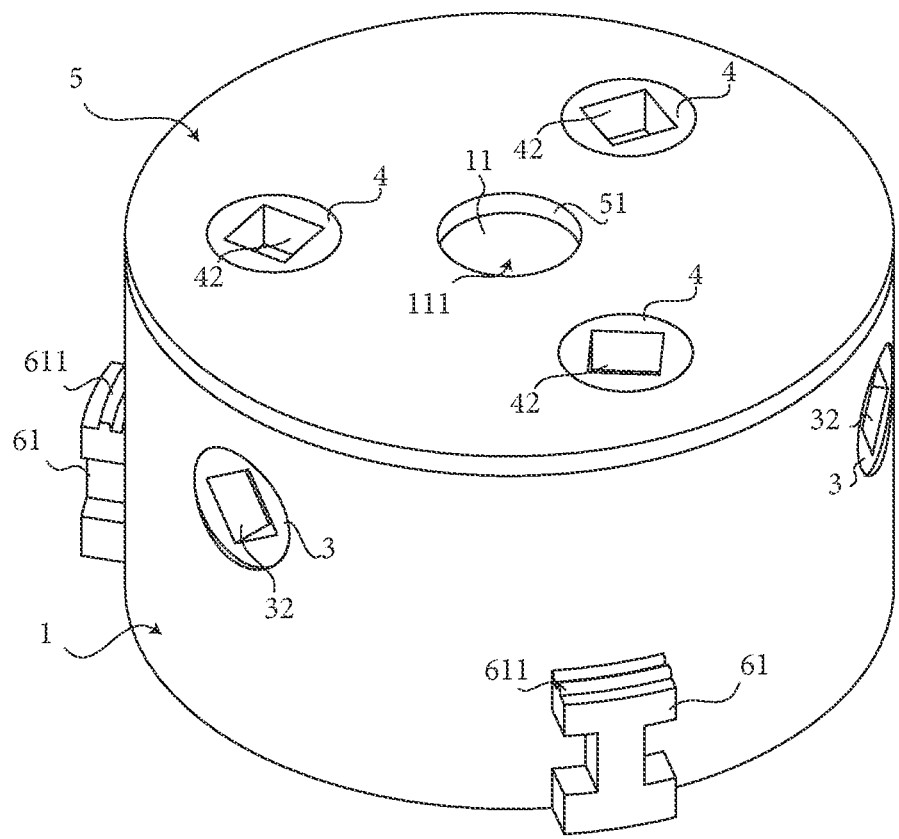
FIG. 1 is a perspective view of the present invention with the back plate attached to the housing.
Figure 2:
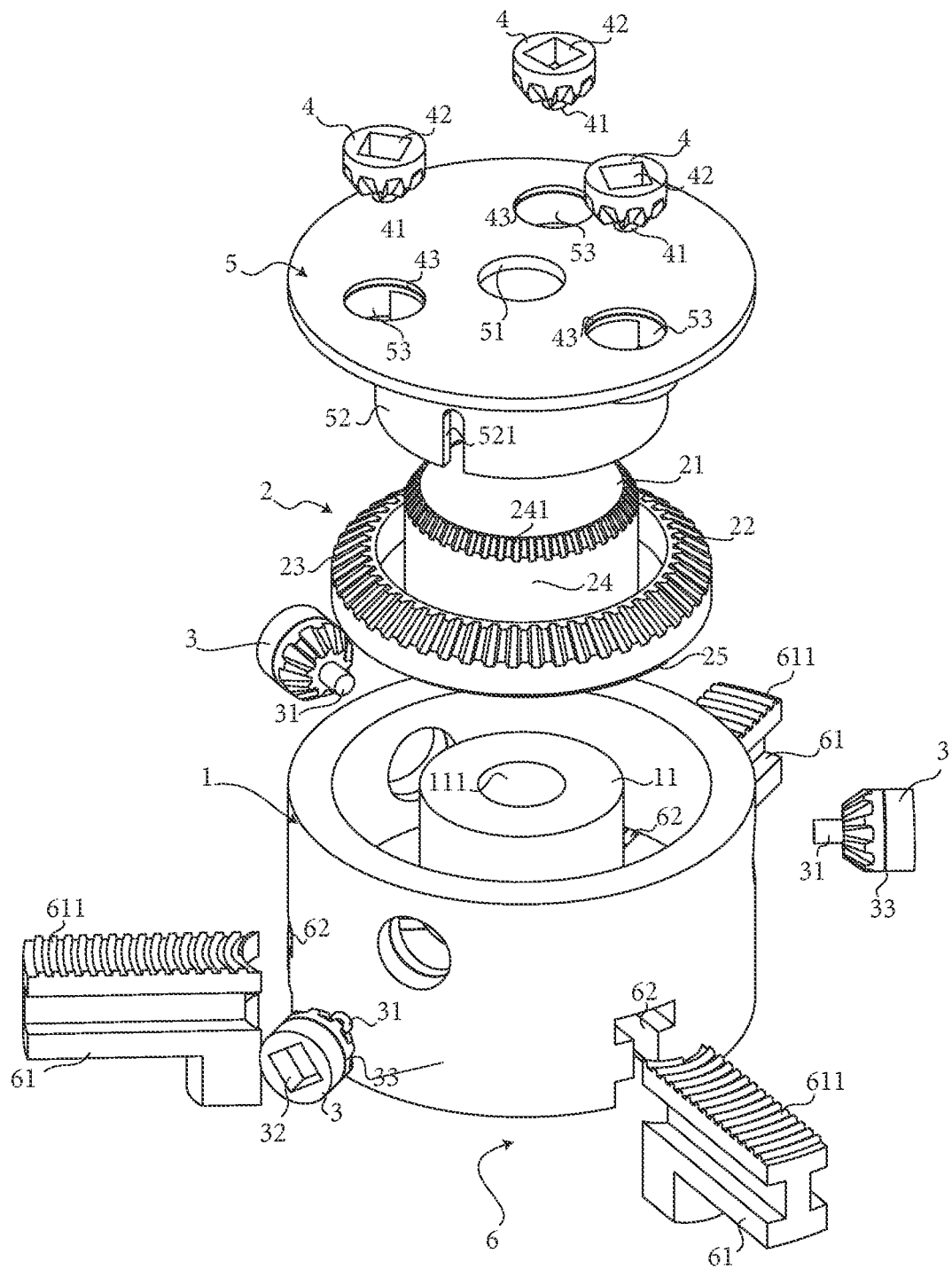
FIG. 2 is an exploded view of the present invention.
Figure 3:
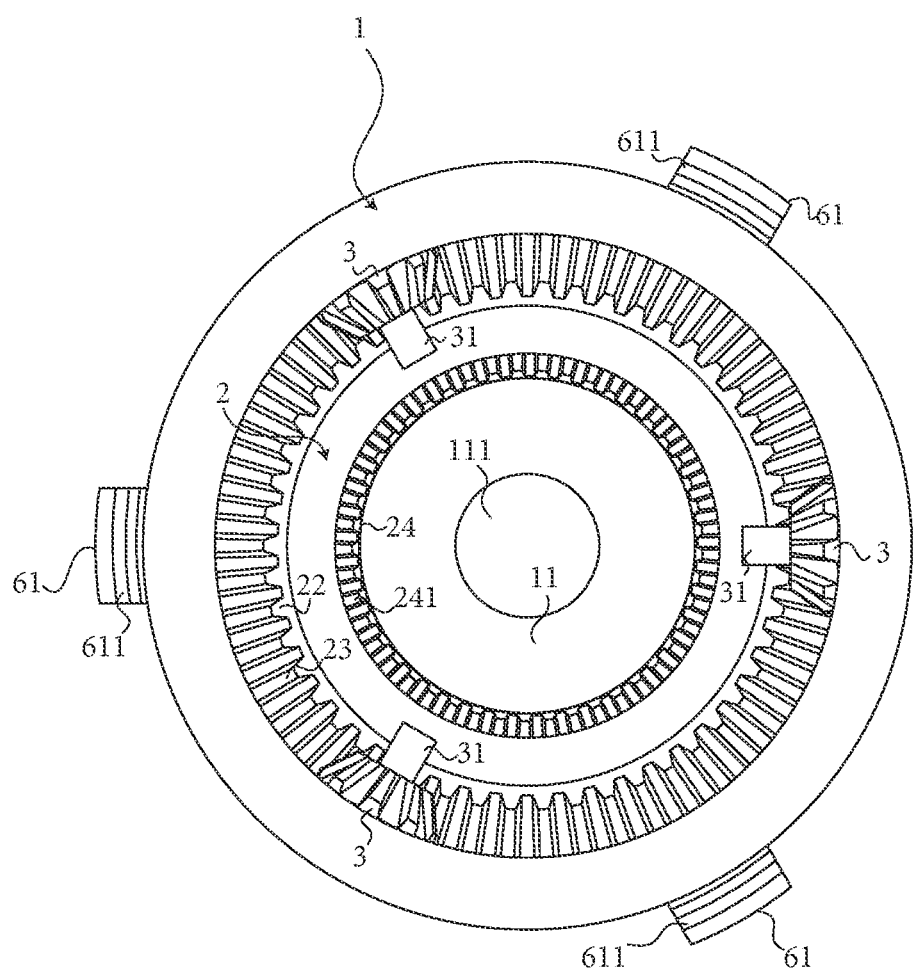
FIG. 3 is a top view of the present invention with the back plate removed from the housing.
Figure 6:
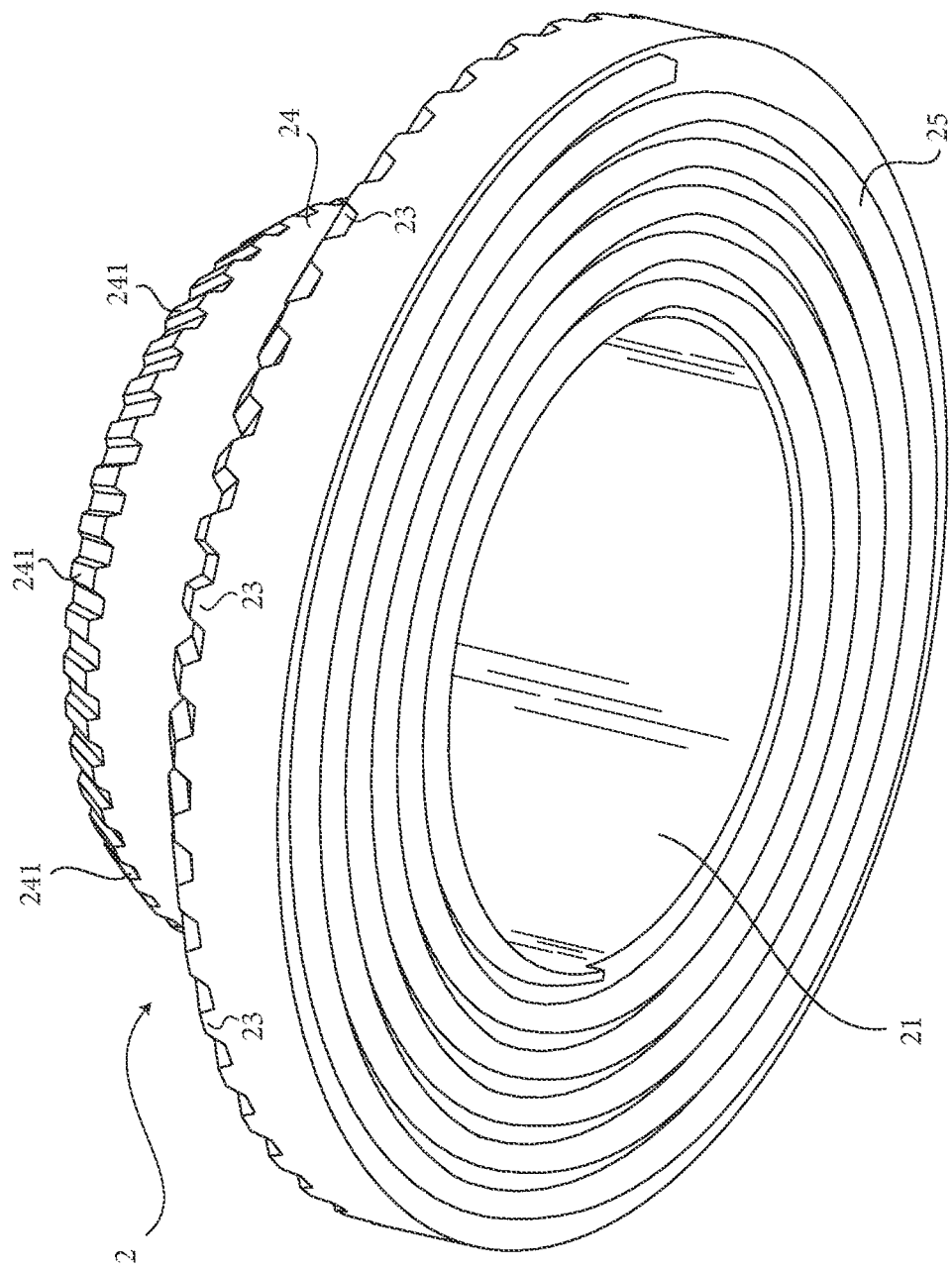
FIG. 6 is an isolated view of the primary gear

All illustrations of the drawings are for the purpose of describing selected versions of the present invention and are not intended to limit the scope of the present invention.

A dual lock brake lathe chuck comprises of a housing 1, a primary gear 2, at least one primary drive gear 3, at least one secondary drive gear 4, a back plate, and a jaw extension system 6. The primary gear 2 is positioned inside the housing 1 and engages the jaw extension system 6. The primary gear 2 comprises of a primary gear center 21, a primary gear first surface 22, a plurality of primary teeth 23, a primary gear wall 24, and a spiral 25. The primary gear center 21 is a center hole on the primary gear 2 where all other components of the primary gear 2 surround the center hole in radial form. The primary gear wall 24 forms the wall of the primary gear center 21 and is positioned between the primary gear center 21 and the primary gear first surface 22. The primary gear first surface 22 is the surface on the primary gear 2 being furthest distance from the center of the gear. A circular indentation is present which separates the primary gear first surface 22 and the primary gear wall 24. The primary gear first surface 22 comprises of a plurality of primary teeth 23 and the top surface of the primary gear wall 24 comprises of a plurality of secondary teeth 241. The spiral 25 spirals horizontally outward from a center point and is attached to the bottom surface of the primary gear 2. The primary gear 2 is fitted onto the central core 11 by sliding the central core 11 into the primary gear center 21. The primary gear 2 fits between the central code and the wall formed by the circumference of the housing 1. A lathe hole 111 is positioned on the center of the central core 11 and is a long cylindrical tunnel which passes through the vertical axis of the present invention. The lathe hole 111 allows the present invention to be mounted on a lathe.

The back plate 5 comprises of a back plate center 51, a drive gear wall 52, and a plurality of secondary pockets 53. The back plate center 51 is a hole positioned at the center of the back plate 5 having a diameter equal to the diameter of the lathe hole 111. The back plate 5 attaches to the back of the housing 1 and covers the components housed within the housing 1. The diameter of the back plate 5 is equal to the diameter of the housing 1 to create a flush edge when the back plate 5 is attached. The back plate center 51 is axially aligned to the central core 11 so that the back plate center 51 aligns with the central core 11. The back plate 5 may be attached to the house with screws, nuts, bolts, or any other attachment means. The drive gear wall 52 is attached perpendicularly to the back plate 5 and forms a circular shape axially aligned with the back plate center 51. A plurality of openings is positioned on the back plate 5 which leads to a plurality of secondary pockets 53. The secondary pockets attach to the back plate 5 and hold the at least one secondary drive gear 4. The drive gear wall 52 furthermore comprises of a primary axle slot 521 wherein the primary axle slot 521 is an oval shaped cutout of the drive gear wall 52 in which an axle can be fit into. The secondary drive gear comprises of a secondary drive gear axle 41, a secondary keyhole 42, and a set of secondary ball bearings 43. The secondary drive gear axle 41 sticks out from the back of the secondary drive gear and allows the secondary drive gear to rotate along the secondary drive gear axle 41. The secondary keyhole 42 is positioned at the end of the secondary drive gear opposite the secondary drive gear axle 41. The secondary keyhole 42 allows a key to fit into, allowing a user to turn the secondary drive gear. The set of secondary ball bearings 43 are positioned on the side of the secondary drive gear and fitted into the plurality of secondary pockets 53. Turning the secondary drive gear rotates the secondary drive gear along the secondary drive gear axle 41 while fitted in the plurality of secondary pockets 53 by means of the secondary ball bearings 43.

The at least one secondary drive gear 4 fitted into the plurality of secondary pockets 53 engages the plurality of secondary teeth 241. When a user uses a key to rotate the secondary drive gear, the engagement with the plurality of secondary teeth 241 causes the primary gear wall 24 to rotate consequently. As the primary gear wall 24 is attached to the primary gear, the primary gear rotates and furthermore spins the spiral 25 and moves the rack 611 of the jaw extension system 6.

The at least one primary drive gear 3 comprises of a primary drive gear axle 31, a primary keyhole 32, and a set of primary ball bearings 33. The at least one primary drive gear 3 is positioned along the lateral face of the housing 1 by fitting the at least one primary drive gear 3 within at least one primary opening. The at least one primary drive gear 3 is positioned to engage with the plurality of primary teeth 23 on the primary gear 2. The at least one primary drive gear 3 rotates by means of a set of primary ball bearings 33 wherein the ball bearings are positioned on the side of the at least one primary drive gear 3 and fitted into the at least one primary opening of the housing 1. The primary drive gear axle 31 is positioned on one end of the at least one primary drive gear 3 and inserted into the housing 1 and positioned in the primary axle slot 521. The primary keyhole 32 is positioned on the at least one primary drive gear 3 opposite of the primary drive gear axle 31. The primary drive gear may be rotated by a user along the primary drive gear axle 31. When a user uses a key to rotate the primary drive gear 3, the engagement of the primary drive gear 3 to the plurality of primary teeth 23 rotates the primary gear. Subsequently, the primary gear 2 rotates the spiral 25 and moves the rack 611 of the jaw extension system 6.

The jaw extension system 6 comprises of a plurality of jaws 61 and a plurality of jaw openings 62. The plurality of jaws 61 furthermore comprises of a rack 611 wherein the rack 611 is positioned on the upper surface of the plurality of jaws 61 and engages the spiral 25 of the primary gear 2. A plurality of jaw openings 62 is positioned along the lateral face of the housing 1 in equal distance from each other. The plurality of jaw openings 62 allows the plurality of jaws 61 to protrude outward from the housing 1 or retract inward into the housing 1. As the spiral 25 spins due to the rotation of the primary gear, engagement of the rack 611 with the spiral 25 results in the plurality of jaws 61 protruding outward or retracting inward. Protrusion of the plurality of jaws 61 allows a user to securely tighten a brake rotor onto the brake lathe chuck.

In the preferred embodiment of the present invention, the present invention introduces a chuck which not only includes the regular key holes that are on the circumference of the chuck, but also includes a set of key holes that are located at the rear of the chuck. The rear key holes are easier to access when a brake rotor is attached to the chuck and allows the user to ensure that the brake rotor is securely tightened onto the brake lathe chuck. The present invention involves three separate keyholes on the rear of the chuck so that placement of the keyholes is not obstructed when a brake rotor is in place. The keyholes on the rear of the chuck allow for a key lock to reach into the chuck to access the gears which can be turned to tighten the plurality of jaws 61 on the chuck. Being able to securely tighten the brake rotor onto the brake lathe chuck ensures safety when in use.

Although the invention has been explained in relation to its preferred embodiment, it is to be understood that many other possible modifications and variations can be made without departing from the spirit and scope of the invention as hereinafter claimed.

What is claimed is:
1. A dual lock brake lathe chuck comprises of:
a housing;
a primary gear;
at least one primary drive gear;
at least one secondary drive gear;
a back plate;
a jaw extension system;
the primary gear positioned inside the housing;
the primary gear engages the jaw extension system;
the at least one primary drive gear engages the primary gear;
the at least one secondary drive gear engages the primary gear;
the housing comprising of a central core wherein the central core being concentric to the housing;
the primary gear comprises of a primary gear center, a primary gear first surface, a plurality of primary teeth, a primary gear wall, and a spiral;
the at least one primary drive gear comprises of a primary drive gear axle, a primary keyhole, and a set of primary ball bearings; and
the at least one secondary drive gear comprises of a secondary drive gear axle, a secondary keyhole, and a set of secondary ball bearings.

2. The dual lock brake lathe chuck as claimed in claim 1 comprises of:
the back plate comprises of a back plate center, a drive gear wall, and a plurality of secondary pockets;
the back plate center being a hole positioned at a center of the back plate;
the drive gear wall being perpendicular to and fixed to the back plate; and
the drive gear wall comprising of a primary axle slot.

3. The dual lock brake lathe chuck as claimed in claim 2 comprises of:
the at least one secondary drive gear is positioned within the plurality of secondary pockets and on the back plate.

4. The dual lock brake lathe chuck as claimed in claim 1 comprises of:
the primary gear center being a hole positioned at a center of the primary gear;
the primary gear wall being positioned between the primary gear center and the primary gear first surface;
the spiral being positioned on a bottom surface of the primary gear, opposite the primary gear first surface;
the primary gear being fitted onto the central core by the primary gear center;
the primary gear comprising of a plurality of primary teeth wherein the plurality of primary teeth is positioned on the primary gear first surface; and
the primary gear comprising of a plurality of secondary teeth wherein the plurality of secondary teeth is positioned on the primary gear wall.

5. The dual lock brake lathe chuck as claimed in claim 2 comprises of:
the at least one primary drive gear attaches to the housing by the set of primary ball bearings;
the primary drive gear axle is positioned into the primary axle slot;
the at least one primary drive gear engages the plurality of primary teeth;
the at least one secondary drive gear attaches to the back plate by the set of primary ball bearings; and
the at least one secondary drive gear engages the plurality of secondary teeth.

6. The dual lock brake lathe chuck as claimed in claim 5 comprises of:
the at least one primary drive gear comprises of a primary keyhole; and the at least one secondary drive gear comprises of a secondary keyhole.

7. The dual lock brake lathe chuck as claimed in claim 1 comprises of:
the jaw extension system comprises of a plurality of jaws and a plurality of jaw openings;
the plurality of jaw openings being positioned on a lateral face of the housing, allowing the plurality of jaws to protrude outward from the housing;
the plurality of jaws being positioned within the plurality of jaw openings; and
the plurality of jaws comprises of a rack wherein the rack engages the spiral of the primary gear.

8. The dual lock brake lathe chuck as claimed in claim 2 comprises of:
the back plate being fixed to the housing;
the back plate center being axially aligned to the central core; and
a lathe hole wherein the lathe hole is centered on the central core and concentric to the central core and the housing.

9. A dual lock brake lathe chuck comprises of:
a housing;
a primary gear;
at least one primary drive gear;
at least one secondary drive gear;
a back plate;
a jaw extension system;
the primary gear positioned inside the housing;
the primary gear engages the jaw extension system;
the at least one primary drive gear engages the primary gear;
the at least one secondary drive gear engages the primary gear;
the housing comprising of a central core wherein the central core being concentric to the housing;
the primary gear comprises of a primary gear center, a primary gear first surface, a plurality of primary teeth, a primary gear wall, and a spiral;
the at least one primary drive gear comprises of a primary drive gear axle, a primary keyhole, and a set of primary ball bearings;
the at least one secondary drive gear comprises of a secondary drive gear axle, a secondary keyhole, and a set of secondary ball bearings;
the back plate comprises of a back plate center, a drive gear wall, and a plurality of secondary pockets;
the back plate center being a hole positioned at a center of the back plate;
the drive gear wall being perpendicular to and fixed to the back plate;
the drive gear wall comprising of a primary axle slot;
the at least one secondary drive gear is positioned within the plurality of secondary pockets and on the back plate;
the jaw extension system comprises of a plurality of jaws and a plurality of jaw openings; and
the plurality of jaw openings being positioned on a lateral face of the housing, allowing the plurality of jaws to protrude outward from the housing.

10. The dual lock brake lathe chuck as claimed in claim 9 comprises of:
the primary gear center being a hole positioned at a center of the primary gear;
the primary gear wall being positioned between the primary gear center and the primary gear first surface;
the spiral being positioned on a bottom surface of the primary gear, opposite the primary gear first surface;
the primary gear being fitted onto the central core by the primary gear center;
the primary gear comprising of a plurality of primary teeth wherein the plurality of primary teeth is positioned on the primary gear first surface; and
the primary gear comprising of a plurality of secondary teeth wherein the plurality of secondary teeth is positioned on the primary gear wall.

11. The dual lock brake lathe chuck as claimed in claim 9 comprises of:
the at least one primary drive gear attaches to the housing by the set of primary ball bearings;
the primary drive gear axle is positioned into the primary axle slot;
the at least one primary drive gear engages the plurality of primary teeth;
the at least one secondary drive gear attaches to the back plate by the set of primary ball bearings; and
the at least one secondary drive gear engages the plurality of secondary teeth.

12. The dual lock brake lathe chuck as claimed in claim 11 comprises of:
the at least one primary drive gear comprises of a primary keyhole; and
the at least one secondary drive gear comprises of a secondary keyhole.

13. The dual lock brake lathe chuck as claimed in claim 9 comprises of:
the plurality of jaws being positioned within the plurality of jaw openings; and
the plurality of jaws comprises of a rack wherein the rack engages the spiral of the primary gear.

14. The dual lock brake lathe chuck as claimed in claim 9 comprises of:
the back plate being fixed to the housing;
the back plate center being axially aligned to the central core; and
a lathe hole wherein the lathe hole is centered on the central core and concentric to the central core and the housing.

15. A dual lock brake lathe chuck comprises of:
a housing;
a primary gear;
at least one primary drive gear;
at least one secondary drive gear;
a back plate;
a jaw extension system;
the primary gear positioned inside the housing;
the primary gear engages the jaw extension system;
the at least one primary drive gear engages the primary gear;
the at least one secondary drive gear engages the primary gear;
the housing comprising of a central core wherein the central core being concentric to the housing;
the primary gear comprises of a primary gear center, a primary gear first surface, a plurality of primary teeth, a primary gear wall, and a spiral;
the at least one primary drive gear comprises of a primary drive gear axle, a primary keyhole, and a set of primary ball bearings;
the at least one secondary drive gear comprises of a secondary drive gear axle, a secondary keyhole, and a set of secondary ball bearings;
the back plate comprises of a back plate center, a drive gear wall, and a plurality of secondary pockets;
the back plate center being a hole positioned at a center of the back plate;

the drive gear wall being perpendicular to and fixed to the back plate;

the drive gear wall comprising of a primary axle slot;

the at least one secondary drive gear is positioned within the plurality of secondary pockets and on the back plate;

the jaw extension system comprises of a plurality of jaws and a plurality of jaw openings;

the plurality of jaw openings being positioned on a lateral face of the housing, allowing the plurality of jaws to protrude outward from the housing;

the primary gear comprising of a plurality of primary teeth wherein the plurality of primary teeth is positioned on the primary gear first surface; and the primary gear comprising of a plurality of secondary teeth wherein the plurality of secondary teeth is positioned on the primary gear wall.

16. The dual lock brake lathe chuck as claimed in claim 15 comprises of:

the primary gear center being a hole positioned at a center of the primary gear;

the primary gear wall being positioned between the primary gear center and the primary gear first surface;

the spiral being positioned on a bottom surface of the primary gear, opposite the primary gear first surface; and the primary gear being fitted onto the central core by the primary gear center.

17. The dual lock brake lathe chuck as claimed in claim 15 comprises of:

the at least one primary drive gear attaches to the housing by the set of primary ball bearings;

the primary drive gear axle is positioned into the primary axle slot;

the at least one primary drive gear engages the plurality of primary teeth;

the at least one secondary drive gear attaches to the back plate by the set of primary ball bearings; and the at least one secondary drive gear engages the plurality of secondary teeth.

18. The dual lock brake lathe chuck as claimed in claim 17 comprises of:

the at least one primary drive gear comprises of a primary keyhole; and the at least one secondary drive gear comprises of a secondary keyhole.

19. The dual lock brake lathe chuck as claimed in claim 15 comprises of:

the plurality of jaws being positioned within the plurality of jaw openings; and the plurality of jaws comprises of a rack wherein the rack engages the spiral of the primary gear.

20. The dual lock brake lathe chuck as claimed in claim 15 comprises of:

the back plate being fixed to the housing;

the back plate center being axially aligned to the central core; and a lathe hole wherein the lathe hole is centered on the central core and concentric to the central core and the housing.

* * * * *